United States Patent [19]

Uetake et al.

[11] Patent Number: 5,605,300
[45] Date of Patent: Feb. 25, 1997

[54] TAPE TENSION REGULATING SYSTEM FOR A TAPE CASSETTE RECORDING AND/OR REPRODUCING APPARATUS ACCOMODATING CASSETTES OF DIFFERENT SIZES

[75] Inventors: Akihiro Uetake, Tokyo; Shuichi Ota, Kanagawa, both of Japan

[73] Assignee: Sony Corporation, Tokyo, Japan

[21] Appl. No.: 521,953

[22] Filed: Aug. 31, 1995

Related U.S. Application Data

[63] Continuation of Ser. No. 73,555, Jun. 9, 1993, abandoned.

[30] Foreign Application Priority Data

Jun. 30, 1992 [JP] Japan ................................. 4-173008

[51] Int. Cl.$^6$ ........................... G11B 23/04; B65H 23/06; B65H 77/00
[52] U.S. Cl. .................. 242/336; 242/334.6; 242/421.8; 360/85; 360/94
[58] Field of Search ................................. 242/334, 334.6, 242/336, 355.1, 358.1, 412.2, 421.8, 422.8, 421.9; 360/85, 94, 96.3, 74.3

[56] References Cited

U.S. PATENT DOCUMENTS

| 4,814,912 | 3/1989 | Kleinlein et al. | 360/96.3 |
| 5,314,141 | 5/1994 | Ishii et al. | 242/336 |

FOREIGN PATENT DOCUMENTS 58-19763  2/1983  Japan ..................................... 242/336

*Primary Examiner*—John Q. Nguyen
*Attorney, Agent, or Firm*—William S. Frommer; Alvin Sinderbrand

[57] ABSTRACT

A recording/reproducing apparatus within which tape cassettes of different sizes are installable includes a tension regulator arm, pivotably supported by a base plate, and in elastic contact with the magnetic tape withdrawn from the tape cassette, and a tension regulating belt, attached to the tension regulator arm at one end thereof, and in slidable contact with a reel mount to apply a braking force thereto, the braking force being altered according to the position of the reel mount. The braking force applied by the tension regulating belt to the reel mount is less when a smaller sized tape cassette is positioned in the apparatus as compared to when a larger sized tape cassette is positioned therein.

1 Claim, 4 Drawing Sheets

TAPE TENSION REGULATING SYSTEM FOR A TAPE CASSETTE RECORDING AND/OR REPRODUCING APPARATUS ACCOMODATING CASSETTES OF DIFFERENT SIZES

This application is a continuation of application Ser. No. 08/073,555, filed Jun. 9, 1993, abandoned.

BACKGROUND OF THE INVENTION

1. Field of The Invention

The present invention relates generally to a recording/reproducing apparatus within which different tape cassettes of different sizes are installable. Specifically, the present invention relates to such recording/reproducing apparatus of minimizing tension difference forced on a recording tape housed in the respective tape cassette.

2. Description of The Background Art

Recently, it has been developed that a compatible type of recording/reproducing apparatus within which different tape cassettes having different distance from a supply to take-up reels between which a recording tape is wound are installable. The reels respectively have reel mounts movable between two positions according to the type of tape cassette installed. Generally, in such compatible type of recording/reproducing apparatus, tape tension is regulated by mechanically regulating braking of the supply reel mount, or by electrically controlling voltage applied to a driving motor of the supply reel mount, i.e., controlling motor torque.

However, tape tension cannot be maintained constantly from the top to the end thereof by the mechanical regulation system. Commonly, according to decrease of winding diameter at the tape end, tape tension is rapidly increased. Therefore, in a small tape cassette having a pair of hubs of small diameter, tape tension is rapidly increased at the tape end comparing to that of a large tape cassette having hubs of larger diameter. On the other hand, amount of tape housed in the small tape cassette is lesser than that of the large one, therefore, maximum winding diameter of the tape reel of the small tape cassette becomes smaller than that of the large one. Accordingly, when the small tape cassette is installed in the apparatus, tape tension alters gradually but becomes large. As a result, tape tension of the small tape cassette at the tape end is higher than that of the large one to cause tape damage and unstable tape loading. Similar problems have been occurred when tape tension is electrically regulated. In addition, when utilizing electrical regulation, control apparatus to control the driving voltage of the driving motor of the reel mount becomes complicated.

SUMMARY OF THE INVENTION

It is therefore a principal object of the present invention to provide a compatible type of recording/reproducing apparatus which can maintain tape tension constantly from the top to end thereof.

It is another object of the present invention to provide a compatible type of recording/reproducing apparatus having simple tension regulation system.

According to one aspect of the present invention, a recording/reproducing apparatus within which different tape cassettes of different sizes are installable is composed of a base plate, a pair of reel mounts movably disposed on the base plate having a proper distance therebetween to receive a tape cassette positioned in the apparatus, at least one of the reel mount at a supply side moves between two positions, tension balancing means pivotably supported by the base plate and elastically contacted with a magnetic tape withdrawn from the tape cassette so as to make a balance with tension of the magnetic tape, and tension regulating means partially fixed to the tension balancing means at one end thereof and slidably contacted with the reel mount of the supply side to apply braking motion of the reel mount. The braking is altered according to size of the tape cassette positioned in the apparatus.

The braking applied by the tension regulating means to the reel mount may be loosened in a first situation when smaller size of the tape cassette is positioned than that in a second situation when larger size thereof is positioned.

The tension regulating means may be a belt having a first end and a second end wraps around the reel mount of the supply side and being fixed the first end to the base plate and the second end to the tension balancing means. The first and second ends are prefer to be positioned such that tension of the belt wrapping around the reel mount is altered according to size of the tape cassette positioned in the apparatus. The reel mount of the supply side in a situation when smaller size of the tape cassette is positioned and that when larger size of the tape cassette is positioned may be asymmetrically positioned against vertical bisector of a line segment extending between the first and second ends of the belt.

According to another aspect of the present invention, a recording/reproducing apparatus within which different tape cassettes of different sizes are installable is composed of a base plate, a pair of reel mounts movably disposed on the base plate having a proper distance therebetween to receive a tape cassette positioned in the apparatus, a motor pivotably moves at least one of the reel mount at a supply side, tension balancing means pivotably supported by the base plate and elastically contacted with a magnetic tape withdrawn from the tape cassette so as to make a balance with tension of the magnetic tape, detecting means for detecting a pivoted position of the balancing means, controlling means for controlling voltage applied to the motor to a level until the pivoting position reaches a predetermined target position, and a cassette identifying means for identifying a size of the tape cassette to alter the target position of the balancing means so as to decrease tension of the magnetic tape when smaller size of the tape cassette is positioned in the apparatus.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
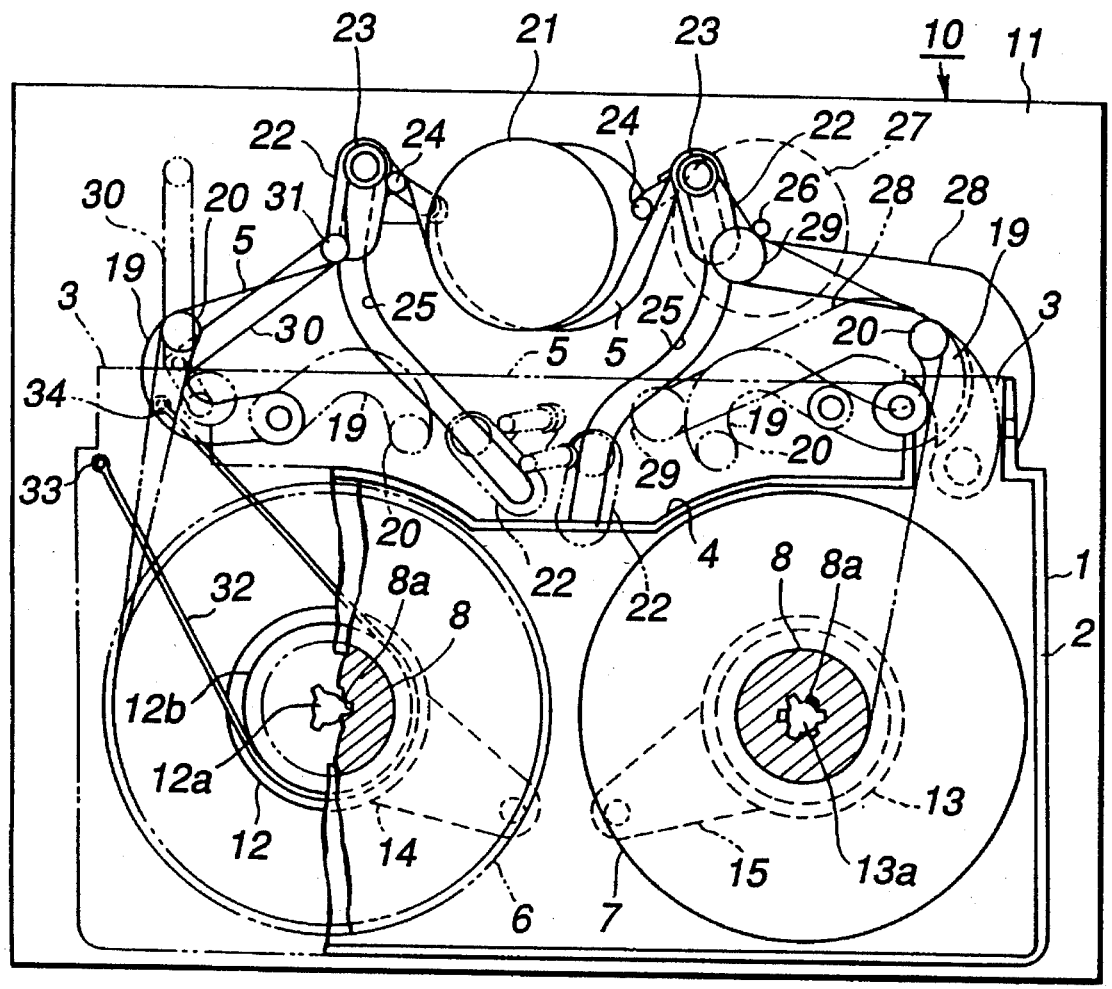
FIG. 1 is a schematic plan view of a recording/producing apparatus of the present invention when a large tape cassette is installed therein.
Figure 2:
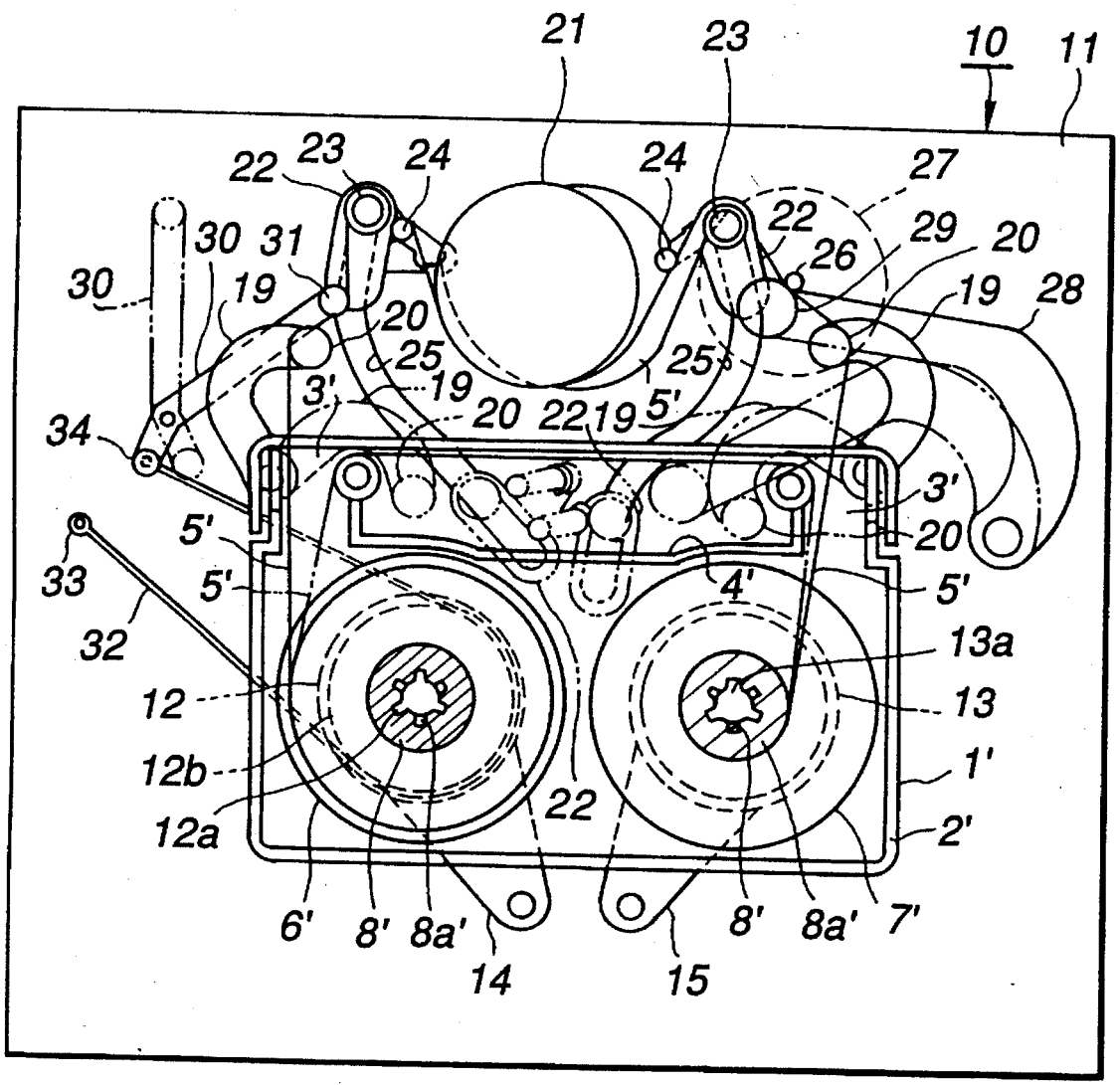
FIG. 2 is a schematic plan view of the apparatus of FIG. 1 when a small tape cassette is installed therein.

Referring now to FIGS. 1 and 2, numeral 10 generally designates a recording/reproducing apparatus of compatible type which can receive two different digital audio tape(DAT) cassettes, one of which is a large tape cassette 1 and the other of which is a small tape cassette 1', wherein an upper surface thereof is eliminated for an explanation. The top position of the figures is a front position of the apparatus 10. The recording/reproducing apparatus 10 includes a base plate 11, a pair of reel mounts 12 and 13 rotatably installed on the base plate 11 having a proper distance therebetween, and a pair of reel mount arms 14 and 15 of which each one end is supported by each reel mount 12 or 13 to freely pivot the other end thereof. The reel mount 12 is disposed on a supply side and the reel mount 13 is disposed on a take-up side. Both reel mount arms 14 and 15 are disposed so that the free ends thereof are faced with proper distance therebetween. A pair of engaging shafts 12a and 13a are projected upwardly from the upper surface of each reel mount 12 or 13. A brake drum 12b is formed downwardly on the lower surface of the reel mount 12 of the supply side.

Referring to FIG. 1, the large tape cassette 1 having generally thinned rectangular frame structure looking from the top is defined by cassette frame 2. The tape cassette 1 is inserted into the recording/reproducing apparatus 10 from the rear to front direction thereof. A tape exit is defined by opposite side walls 3, and a mouth portion 4. The mouth portion 4 is opened between both opposite side walls 3 in the forwardly and downwardly direction of the tape cassette insertion. A pair of tape reels 6 and 7, one of which is a supply reel 6 and the other of which is a take-up reel 7, having a magnetic tape 5 engaged therewith and wound therearound are rotatably installed in the cassette frame 2. A pair of hubs 8 of both reels 6 and 7 respectively have engagement holes 8a to engage with a pair of the engaging shafts 12a and 13a. The supply and take-up reels 6 and 7 are located so that the magnetic tape 5 wound therebetween travels through a path along adjacent the front surface of the mouth portion 4. A front lid(not illustrated in the figure) is pivotably installed over and along the front surface of the tape exit of the tape cassette 1 generally in a closed position but rotates into an open position to expose the magnetic tape 5 once the tape cassette 1 is inserted into the recording/reproducing apparatus 10.

Referring to FIG. 2, a small tape cassette 1', having similar structure to the large one 1 but smaller than that, is defined by a small cassette frame 2'. In a manner similar to the large tape cassette 1, a small tape exit is defined by opposite side walls 3', and a mouth portion 4'. A pair of tape reels 6' and 7', one of which is a supply reel 6' and the other of which is a take-up reel 7', having a magnetic tape 5' engaged therewith and wound therearound are rotatably installed in the cassette frame 2'. A pair of hubs 8' of both reels 6' and 7' having diameter smaller than that of the large one 1 and engagement holes 8a' respectively to engage with a pair of the engaging shafts 12a and 13a on the base plate 11 of a recording/reproducing apparatus 10 are formed on the both reels 6' and 7'. The engagement holes 8a' are formed so as to have approximately similar diameter as those of the engagement holes 8a. The supply and take-up reels 6' and 7' are located so that the magnetic tape 5' wound therebetween travels in a manner similar to that of the large tape cassette 1.

The reel mount arms 14 and 15 are moved from a first position of which the large tape cassette 1 is positioned to a second position of which the small tape cassette 1' is positioned, as illustrated in FIGS. 1 and 2. When the arms 14 and 15 are in the second position, axes distance between the reel mounts 12 and 13 is equal to that between the tape reels 6' and 7' of the small tape cassette 1'. Similarly, when the arms 14 and 15 are in the first position, axes distance between the reel mounts 12 and 13 is equal to that between the tape reels 6 and 7 of the large tape cassette 1.

A pair of withdrawn arms 19 are pivotably supported by the base plate 11 at each one end thereof. A pair of guides 20 are projected upwardly from the other ends of the both arms 19. The arms 19 and guides 20 are in an initial position illustrated by a broken line of FIG. 1 or 2 before the tape cassette 1 or 1' is inserted into the apparatus 10. Once the large cassette 1 is inserted(when the reel mount arms 14 and 15 are pivoted to the first position), the arms 19 and the guides 20 are pivoted into a first position illustrated by a solid line of FIG. 1. On the other hand, once the small cassette 1' is inserted(when the reel mount arms 14 and 15 are pivoted to the second position), the arms 19 and the guides 20 are pivoted into a second position illustrated by a solid line of FIG. 2.

A head drum 21 is installed on the base plate 11 so as to be positioned at approximately center portion adjacent the front wall of the apparatus 10. The head drum 21 includes a fixed drum and a rotatable drum on which a magnetic head for recording/reproducing is supported(these are not illustrated). A pair of loading blocks 22, respectively having a loading guide 23 and an inclined guide 24, are installed in the apparatus 10 such that the blocks 22 move along guide slits 25 formed on the base plate 11 being guided thereby. When unloaded, the loading blocks 22 are in an initial position positioned within the tape exit as illustrated by a broken line of FIGS. 1 and 2 then moved into a loading position positioned adjacent the both sides of the head drum 21 respectively, once the tape is loaded.

A capstan 26 driven by a capstan motor 27 is projected upwardly from the base plate 11 at the take-up side adjacent the head drum 21. A pinch roller arm 28 is installed on the base plate 11, adjacent where the withdrawn arm 19 of the take-up side is installed, of which one end thereof is pivotably supported by the plate 11, and the other end thereof has a pinch roller 29 rotatably mounted thereon. When unloading, the pinch roller arm 28 is in an initial position positioned approximately within the tape exit as illustrated in FIGS. 1 and 2, then moved into a loading position such that the pinch roller 29 is pressed into contact with the capstan 26 via the magnetic tape 5 or 5' when loading.

Figure 3:
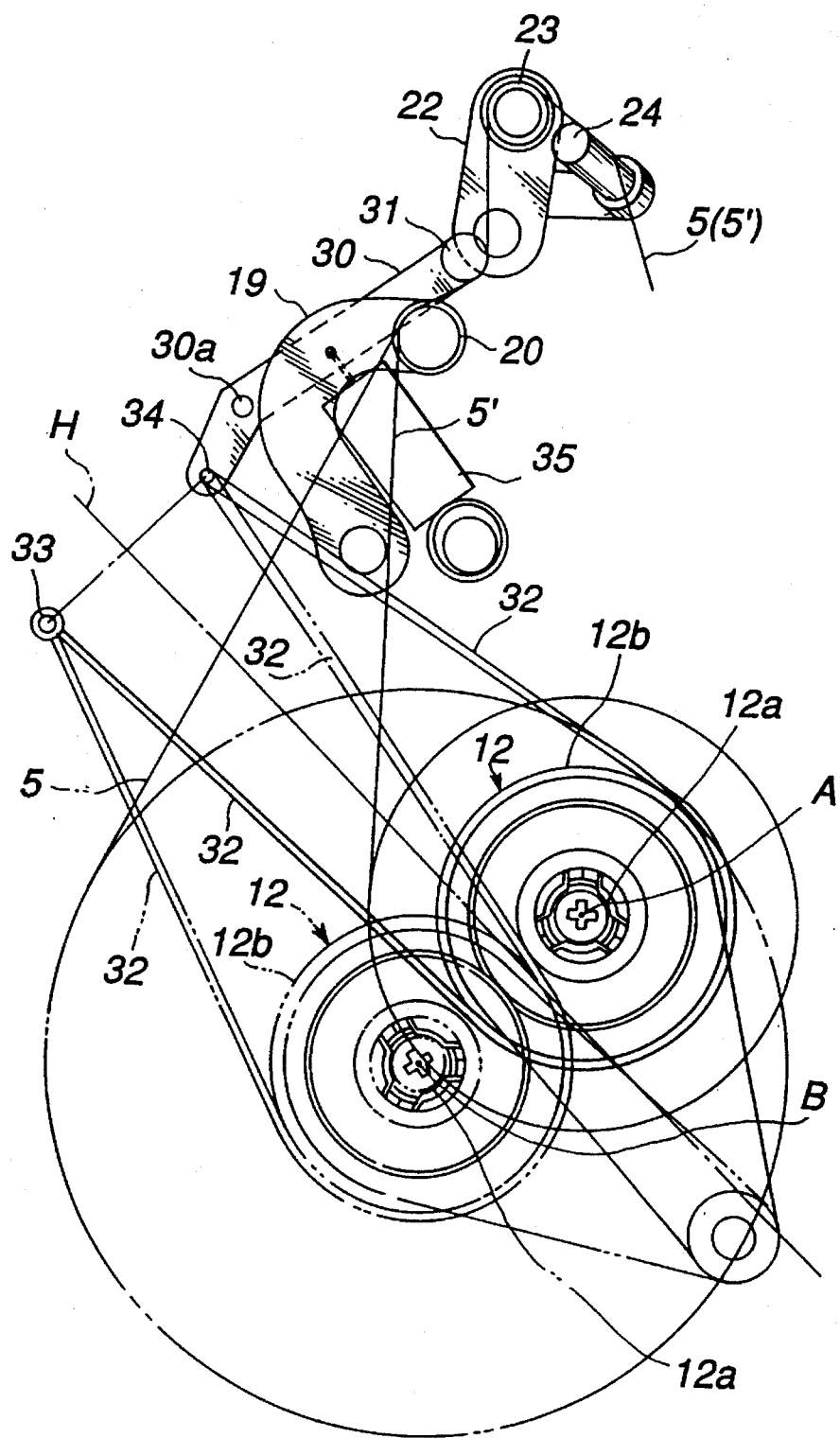
FIG. 3 is an enlarged plan view of particular portions of a mechanical tape tension regulating system installed in the apparatus of FIGS. 1 and 2.

A tension regulator arm 30 having a forward and rearward ends and extending therebetween is pivotably mounted as at 30a on FIG. 3 at a point adjacent the rearward end thereof on the supply side of the base plate 11 approximately between the guide slit 25 and a side wall of the recording/reproducing apparatus 10. A tape guide 31 is projected upwardly from the forward end of the tension regulator arm 30. When unloading, the arm 30 is in an initial position extending approximately parallel with the side wall of the apparatus 10, as illustrated by a broken line of FIG. 1 or 2. Pivotal movement of the arm 30 is locked(a waiting position). Once the tape 5 or 5' is loaded, the lock is released to pivot the arm 30 in a clockwise direction according to force applied by an extension coil spring 35 to move into a loading position so that the arm 30 is elastically contact with the magnetic tape 5 or 5' at a point between the supply side of the withdrawn guide 20 and the loading guide 23.

A brake belt 32 having an elongated band structure is installed in the apparatus 10 being fixed both ends thereof, wherein one of which is fixed to a projection 33 projected from the base plate 11 adjacent the side wall of the supply side of the apparatus 10 and the other of which is fixed to a projection 34 projected from the rearward end of the tension regulator arm 30. The brake belt 32 wraps around the brake drum 12b of the supply reel mount 12. FIG. 3 illustrates a relationship between the brake belt 32 and the supply reel mount 12. When the small tape cassette 1' is inserted in the apparatus 10, the supply reel mount 12 is in a A position as illustrated, on the other hand, when the large tape cassette 1 is inserted therein, that is in a B position as illustrated. The projections 33 and 34 are placed such that tension of the belt 32 wrapped around the supply reel mount 12 in the A position is loosened as compared with the tension when the reel mount 12 is in the B position. That is, the A and B positions of the reel mount 12 are asymmetrically positioned in respect to a perpendicular bisector H of a line segment extending between the projections 33 and 34.

When the tape cassette 1 or 1' is inserted into the recording/reproducing apparatus 10, i.e., the magnetic tape 5 or 5' is loaded, the withdrawn guides 20, the loading guides 23, the incliner guides 24 and pinch roller 29, wherein all are in initial position as previously mentioned, are inserted in the mouth portion 4 or 4' of the tape cassette 1 or 1'. When the large tape cassette 1 is inserted, the engaging shafts 12a and 13a of the reel mounts 12 and 13 at the B position illustrated in FIG. 3 are engaged with the engagement holes 8a of the tape reels 6 and 7, on the other hand, when the small tape cassette 1' is inserted, those at the A position illustrated in FIG. 3 are engaged with the engagement holes 8a' of the tape reels 6' and 7'. Then, the loading blocks 22 are moved into the loading position via the guide slit 25. Then, the withdrawn guides 20 are moved into the first position when the large cassette 1 is inserted or into the second position when the small cassette 1' is inserted. Thus, the magnetic tape 5 or 5' is withdrawn from the tape exit (the mouth portion 4 or 4') of the tape cassette 1 or 1' by the withdrawn arms 19, passed through the predetermined tape path to be wrapped around the head drum 21. Accordingly the magnetic tape 5 or 5' is set in the loading position. When the magnetic tape is recorded or reproduced, the pinch roller 29 is pressed into contact with the capstan 26 via the magnetic tape 5 or 5', then the waiting position of the tension regulator arm 30 is unlocked so that the tape guide 31 is elastically contacted with the magnetic tape 5 or 5'.

When tension of the magnetic tape 5 or 5' at the supply side of the head drum 21 becomes small, the tension regulator arm 30 pivots in a clockwise direction such that the rearward end thereof where the projection 34 is installed is moved into a position apart from the reel mount 12. Therefore, the brake belt 32 tightens the brake drum 12b of the reel mount 12 to increase tension of the magnetic tape.

On the other hand, when the tension of the magnetic tape at the same side becomes large, the tension regulator arm 30 pivots in a counterclockwise direction such that the rearward end thereof is moved into a position toward the reel mount 12. Therefore, tightening of the brake belt 32 against the brake drum 12b is loosened to decrease tension of the magnetic tape.

According to the aforementioned embodiment, when the small tape cassette 1' is positioned, the brake belt 32 is wrapped more loosely around the brake drum 12b of the supply reel mount 12 than is the case when the large tape cassette 1 is positioned, because of positioning of the projections 33 and 34 of the brake belt 32. Therefore, tension increasing of the magnetic tape 5' of the small tape cassette 1' of which diameter of the hub 8' is smaller than that of the large tape cassette 1 can be suppressed. Thus, at the tape end of the small cassette 1', i.e., the magnetic tape 5' which is substantially wound around the supply reel 6', cannot be highly tensioned comparing from that of the large tape cassette 1. Thus, tape loading can be stabilized, and tape damaging can be reduced. Thereby recording or reproducing reliability of the recording/reproducing apparatus 10 is significantly enhanced.

Figure 4:
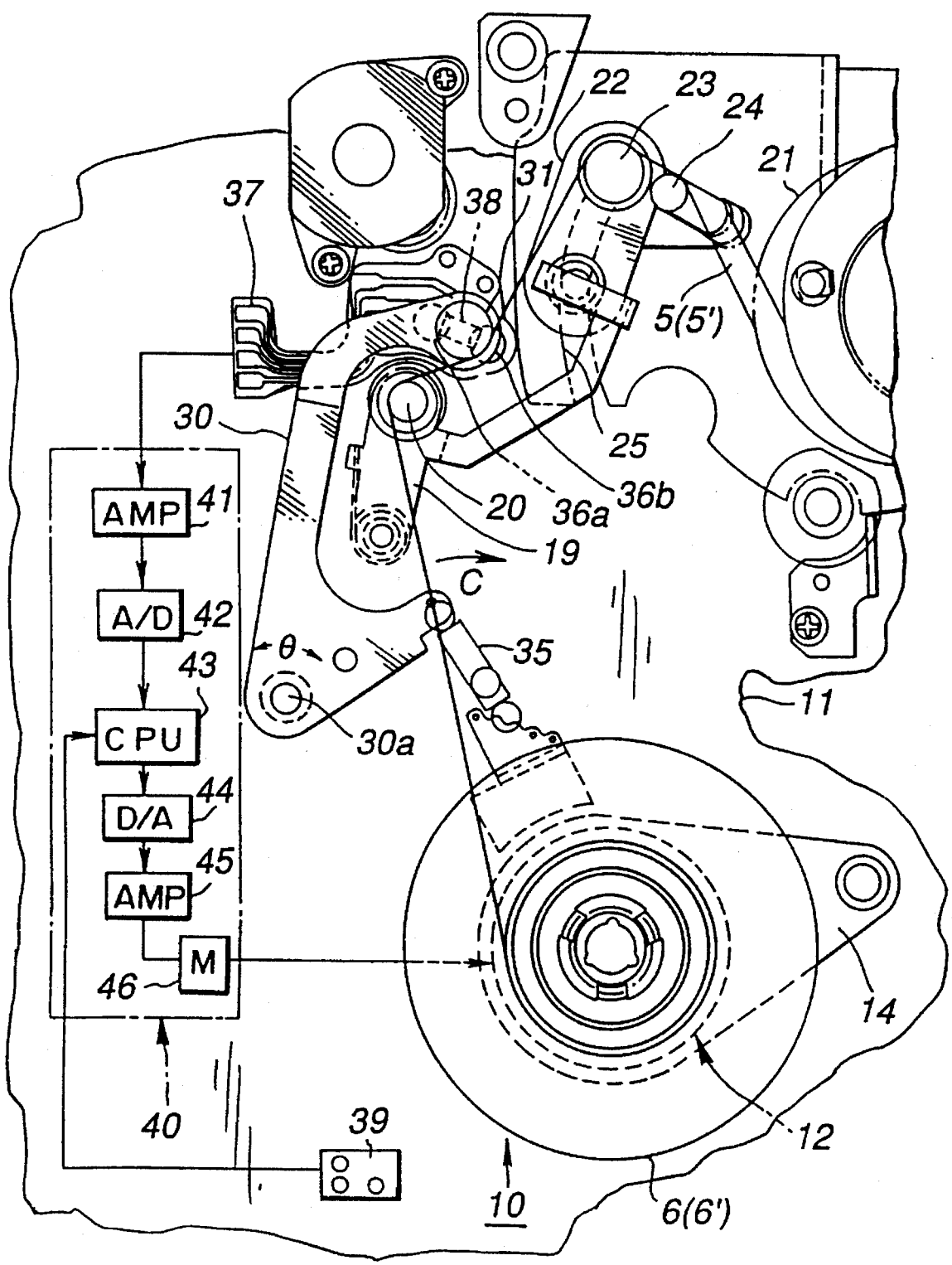
FIG. 4 is an enlarged plan view of particular portions of an electrical tape tension regulating system installed in the apparatus of FIGS. 1 and 2.

FIG. 4 illustrates another embodiment of the present invention. In this embodiment, tension of the magnetic tape 5 or 5' is electrically controlled to suppress tension increase of the magnetic tape 5' housed in the small tape cassette 1' having hubs of which diameter is smaller than that of the large tape cassette 1. Hereinafter, the same members as the previous embodiment are given the same numerals. A tension regulator arm 30 is pivotably mounted on the base plate 11 at a pivot point 30a. A N pole magnet 36a and a S pole magnet 36b are fixed downwardly on the bottom surface of the tension regulator arm 30 at the forward end where the tape guide 31 is installed. A flexible control panel 37 having a Hall element, i.e., detecting means, to detect pivoting angle θ is placed on the base plate 11 at a portion beneath the tape guide 31.

Numeral 39 designates a cassette identifying switch to identify the size of the cassette positioned in the recording/reproducing apparatus 10, i.e., the large cassette 1 or the small cassette 1'. Numeral 40 designates a control circuit for controlling voltage applied to a driving motor 46 to pivot the reel mount 12 corresponding to pivoting angle of the tension regulator arm 30 detected. In the circuit 40, numeral 41 designates an amplifier, 42 designates an A/D converter, 43 designates a CPU system, 44 designates a D/A converter, and 45 designates an amplifier.

When either of the tape cassettes is positioned on the reel mounts 12 and 13 of the recording/reproducing apparatus 10 via a cassette holder not illustrated, size of the tape cassette is identified by the cassette identifying switch 39. Thereby, the CPU system 43 identifies the type of tape cassette, concurrently, identifies the type of magnetic tape, e.g., tape thickness, housed therein by a recognition hole via a switch, both are not illustrated in the figure.

Then, once the magnetic tape is in recording or reproducing position, the position of the tape guide 31 of the tension regulator arm 30, spring-urged in a direction of an arrow C and pivoted at a point 30a, is detected by the pair of magnets 36a and 36b and the Hall element 38 on the base plate 11. The magnetic tape 5 or 5' is loaded on the tape guide 31. Therefore, pivotal movement of the tension regulator arm 30 is stopped at a point where tape tension is balanced with resistance of the extension coil spring 35. Therefore, tape tension is maintained constantly by maintaining the tension regulator arm 30 at a constant position. The CPU system 43 detects the pivoted position of the tension regulator arm 30 via the Hall element 38, the amplifier 41 and the A/D converter 42 to control voltage applied to the motor 46 such that the pivoted position of the arm 30 is in a target position.

When the small tape cassette 1' is positioned, the target position is altered in the CPU system 43 according to a signal obtained by the cassette identifying switch 39 to decrease the predetermined value of tape tension comparing to that of the case when the large tape cassette 1 is positioned. Thus, significant increase of tape tension does not occur if the wound diameter of the magnetic tape wound around the hub 8' in the small tape cassette 1' becomes small.

According to the first embodiment of the present invention, the reel mount of the supply side is positioned such that the brake belt wrapped therearound when the small tape cassette is inserted is a little looser than that when the large tape cassette is inserted. Therefore, tension difference applied on the recording tape commonly generated by the difference of the hub diameter of the tape cassette applied can be decreased. Thus, tape tension at the tape end of the small tape cassette is not higher than that of the large tape cassette. Therefore, tape loading can be stabilized and tape damaging can be reduced to significantly enhance the reliability of the recording/reproducing apparatus. Additionally, tension regulation of the recording tape is done by mechanical tension regulation system of the tension regulator arm and the belt member. Therefore, manufacturing of the apparatus can be accomplished easily and at reduced cost. Furthermore, weight increase of the apparatus can be minimized.

According to another embodiment of the present invention, voltage applied to the driving motor of the supply reel mount is electrically controlled by the control circuit to alter the target position of the tension regulator arm. Thus, the predetermined value of tape tension is decreased when the small cassette tape is positioned. Therefore, tension difference applied on the recording tape commonly generated by the difference of the hub diameter of the tape cassette applied can be decreased. Thus, tape tension at the tape end of the small tape cassette is not higher than that of the large tape cassette. Therefore, tape loading can be stabilized and tape damaging can be reduced to significantly enhance the reliability of the recording/reproducing apparatus.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modification to the shown embodiments which can be embodied without departing from the principle of the inventions as set forth in the appended claims. For example, a VHS tape cassette or 8 mm tape cassette may be adopted to the aforementioned embodiments, not limited by the DAT(digital audio tape) cassette.

What is claimed is:

1. A recording/reproducing apparatus within which different tape cassettes of different sizes are installable, comprising:

a base plate, a pair of reel mounts movably disposed on said base plate for selectively setting a predetermined distance between the mounts to receive thereon a tape cassette positioned in said apparatus, at least one of said reel mounts being movable between a first position and a second position, tension balancing means pivotably supported by said base plate and positioned to be in elastic contact with a magnetic tape withdrawn from a tape cassette positioned on said reel mounts so as to pivot in response to a change in the tension of said magnetic tape, and a tension regulating belt having first and second ends and wrapping around said at least one of said reel mounts, said belt being fixed at said first end to said base plate and at said second end to said tension balancing means and being in slidable contact with said at least one reel mount for applying a braking force thereto, said first and second positions of said at least one of said reel mounts being asymmetrically positioned with respect to a perpendicular bisector of a line segment connecting said first and second ends of said belt so that said braking force is altered according to the position of said at least one of said reel mounts.

* * * * *